(12) United States Patent
Adey et al.

(10) Patent No.: US 10,024,552 B2
(45) Date of Patent: Jul. 17, 2018

(54) CONNECTION ASSEMBLY

(71) Applicant: Adey Holdings (2008) Limited, Gloucestershire (GB)

(72) Inventors: Christopher Adey, Gloucestershire (GB); Simon Downie, Gloucestershire (GB); Kashem Pathan, Worcestershire (GB)

(73) Assignee: ADEY HOLDINGS (2008) LIMITED, Gloucestershire (GB)

( * ) Notice: Subject to any disclaimer, the term of this patent is extended or adjusted under 35 U.S.C. 154(b) by 101 days.

(21) Appl. No.: 15/125,395

(22) PCT Filed: Mar. 6, 2015

(86) PCT No.: PCT/GB2015/050667
§ 371 (c)(1),
(2) Date: Sep. 12, 2016

(87) PCT Pub. No.: WO2015/136249
PCT Pub. Date: Sep. 17, 2015

(65) Prior Publication Data
US 2017/0074524 A1 Mar. 16, 2017

(30) Foreign Application Priority Data
Mar. 13, 2014 (GB) .................................. 1404432.5

(51) Int. Cl.
*F16L 55/00* (2006.01)
*F24D 19/00* (2006.01)
(Continued)

(52) U.S. Cl.
CPC ..... *F24D 19/0092* (2013.01); *B01D 21/0003* (2013.01); *B01D 21/0009* (2013.01);
(Continued)

(58) Field of Classification Search
CPC .. F16L 19/0206; F16L 19/0231; F16L 19/005
(Continued)

(56) References Cited

U.S. PATENT DOCUMENTS

| 219,032 | A | * | 8/1879 | Stewart | ................... | F16L 47/24 |
| | | | | | | 285/148.13 |
| 292,349 | A | * | 1/1884 | Payne | ....................... | F16K 3/08 |
| | | | | | | 137/625.31 |

(Continued)

FOREIGN PATENT DOCUMENTS

| AU | 2496395 A | 2/1996 |
| BE | 546074 A | 10/1959 |

(Continued)

*Primary Examiner* — Aaron M Dunwoody
(74) *Attorney, Agent, or Firm* — Michael E. Dockins; Shumaker, Loops & Kendrick, LLP (57) ABSTRACT

A connection assembly is disclosed for connecting a magnetic separator into a central heating system circuit, the magnetic separator including a housing, a separation chamber within the housing, and externally threaded inlet and outlet ports extending from the housing. The connection assembly comprises: a fitment adapted to be received within at least one of the ports of the separator, the fitment including a bore for carrying fluid from/to the central heating circuit to/from the separator; a threaded connector disposed around the bore for securing the fitment to the or each port, the threaded connector having a hand grip area for facilitating tightening of the connector by hand; and a removable force transfer element receivable between the fitment and the threaded connector for transferring force between the threaded connector and the fitment.

20 Claims, 7 Drawing Sheets

(51) Int. Cl.
  *B01D 21/00* (2006.01)
  *B03C 1/28* (2006.01)
  *B03C 1/033* (2006.01)
  *B01D 21/24* (2006.01)
  *B01D 21/26* (2006.01)
  *B03C 1/02* (2006.01)
  *F16L 37/56* (2006.01)

(52) U.S. Cl.
  CPC ....... *B01D 21/2483* (2013.01); *B01D 21/267* (2013.01); *B03C 1/02* (2013.01); *B03C 1/0332* (2013.01); *B03C 1/286* (2013.01); *F16L 37/565* (2013.01); *B03C 2201/18* (2013.01); *B03C 2201/20* (2013.01); *B03C 2201/28* (2013.01)

(58) Field of Classification Search
  USPC .................... 285/92, 386, 89, 247
  See application file for complete search history.

(56) References Cited

U.S. PATENT DOCUMENTS

| | | | | |
|---|---|---|---|---|
| 509,742 | A * | 11/1893 | Lane | F16L 19/005 285/353 |
| 762,350 | A * | 6/1904 | Rehnstrom | F16L 19/0225 285/148.19 |
| 1,672,679 | A * | 6/1928 | Fitzgerald | F24D 19/0002 165/53 |
| 1,726,238 | A * | 8/1929 | Pipher | F16L 33/225 285/148.13 |
| 2,367,447 | A * | 1/1945 | Strout | F16L 33/24 285/247 |
| 2,417,350 | A * | 3/1947 | Conroy | B23P 11/005 285/332 |
| 2,449,588 | A * | 9/1948 | Clafford | F16L 15/02 285/334.4 |
| 2,704,678 | A * | 3/1955 | Klein et al. | F16N 21/04 285/148.19 |
| 3,749,356 | A * | 7/1973 | Conley | F16L 19/025 222/3 |
| 5,261,240 | A * | 11/1993 | Oyler | F16L 19/0231 285/80 |
| 5,280,966 | A * | 1/1994 | Morris | F16L 19/005 285/184 |
| 6,368,135 | B1 * | 4/2002 | Ho | H01R 13/622 285/92 |
| 7,914,052 | B1 | 3/2011 | Christianson | |
| 8,500,175 | B2 * | 8/2013 | Jung | F16L 47/04 285/386 |
| 8,555,765 | B2 * | 10/2013 | Graham, II | F41A 21/325 285/92 |
| 9,885,437 | B2 * | 2/2018 | Liu | F16L 41/14 |
| 2004/0212192 | A1 | 10/2004 | Williams | |
| 2008/0116688 | A1 * | 5/2008 | Bull | F16L 15/009 285/386 |
| 2012/0067802 | A1 | 3/2012 | Irvin | |
| 2012/0161433 | A1 | 6/2012 | Magargal et al. | |
| 2013/0126644 | A1 * | 5/2013 | Popovich | F01N 3/206 239/569 |
| 2013/0161941 | A1 | 6/2013 | Zulauf et al. | |
| 2015/0247595 | A1 * | 9/2015 | Laverdiere | B01D 63/14 285/386 |
| 2015/0308591 | A1 * | 10/2015 | Davino | E03C 1/025 285/92 |
| 2016/0158989 | A1 * | 6/2016 | Schroder | F16L 51/00 285/41 |
| 2017/0051858 | A1 * | 2/2017 | Thibodeaux | F16L 19/005 |

FOREIGN PATENT DOCUMENTS

| | | |
|---|---|---|
| EP | 2453157 A2 | 5/2012 |
| GB | 274729 A | 7/1927 |
| GB | 1383582 A | 2/1974 |
| GB | 2291153 A | 1/1996 |
| GB | 2349685 A | 11/2000 |
| GB | 2469145 A | 10/2010 |
| GB | 2491246 A | 11/2012 |
| GB | 2500908 A | 10/2013 |
| GB | 2504537 A | 2/2014 |
| WO | 9503508 A1 | 2/1995 |
| WO | 2004027306 A1 | 4/2004 |
| WO | 2012073029 A1 | 6/2012 |

\* cited by examiner

CONNECTION ASSEMBLY

CROSS-REFERENCE TO RELATED APPLICATIONS

This application is a National Stage of International Application No. PCT/GB2015/050667, filed on Mar. 6, 2015, which in turn claims priority to Great Britain Patent Application No. GB1404432.5, filed on Mar. 13, 2014. The entire disclosures of the above applications are hereby incorporated herein by reference.

FIELD OF THE INVENTION

The present invention relates to a connection assembly, particularly a connection assembly for connecting a magnetic separator into a central heating system.

BACKGROUND TO THE INVENTION

Separators, particularly magnetic separators, are now widely fitted to domestic and commercial central heating systems. The separators remove debris, and particularly magnetic debris, from the heating fluid. This keeps the heating fluid clean, preventing build-up of debris in, for example, the boiler, where it may cause expensive damage.

When a heating system is serviced, the magnetic separator must be cleaned to remove the particles which have been separated from the fluid. A removable screw-top is typically provided at the upper end of a cylindrical housing which, when removed, allows access to the inside of the cylindrical housing. A removable insert is typically provided within the housing, which can then be removed for cleaning. Although it is preferable to install the filter with enough space to allow the insert to be removed, this is not possible in every installation. It is therefore useful to provide a connection which allows the whole filter to be easily removed from the heating circuit.

The insert may also include a separate chamber, typically smaller than the main chamber, through which a portion of circulating flow may pass. The flow in the smaller chamber is generally slowed by obstacles, causing non-magnetic particulate matter to fall out of the flow. The benefit of having the separate chamber is that the flow in the main chamber is substantially unrestricted and pressure drop across the separator is minimised.

It is understood that where a magnet is used to separate magnetic debris, to be most effective, any plastics sleeve over the magnet needs to be of thin material to maximise the effect of the magnet in the chamber. Manufacturing a thin sleeve poses significant design and manufacturing problems, particularly where the magnets to be covered are greater than a certain length, for larger separators used in larger heating systems.

Generally isolation valves are used to connect a separator to a central heating circuit and these valves are connected to the inlet and outlet by either push fit or screw connections. On small separators, designed for systems with typically up to 22 mm pipework running to and from the boiler, push fit connectors are preferred and the applicant has developed designs for connecting and disconnecting both the inlet and outlet connections simultaneously, which are disclosed in for example PCT/GB2013/052880. This is of significant benefit, because it is extremely difficult, if not impossible, to release more than one push fit connector at a time. However, problems arise in trying to design similar arrangements for larger separators, for example, for fitting to 28 mm pipe work. Push-fit connectors are generally less reliable for larger pipe sizes, and the larger spacing between the inlet and outlet makes it difficult to produce a release tool to release both connectors simultaneously.

Where 28 mm connections to separators are currently made, the connections are exclusively screw connections and require large spanners or tools to tighten and release. Use of tools of this size can be difficult where space is limited. Also, the inlet and outlet ports on separators are typically made from plastics, and large torsional forces from a spanner on the ports to disconnect and reconnect from the fittings and/or pipe may cause weakness or cracks in the separator housing over time, resulting in leakage. If a separator housing becomes cracked, then it is unlikely that an effective repair will be possible, and the separator will have to be replaced. Once any threaded connection has been undone, it may still be difficult to remove a separator from its fittings, particularly if it has not been removed for a long time, because the seals may have hardened and stuck to the parts.

It is also easy to damage a plastic thread by over-tightening and cross-threading. If damage does occur, it is nearly impossible to repair.

It is an object of this invention to provide a connection assembly for a separator which reduces or substantially obviates the above mentioned problems.

STATEMENT OF INVENTION

According to a first aspect of the present invention, there is provided a connection assembly for connecting a magnetic separator into a central heating system circuit, the magnetic separator including a housing, a separation chamber within the housing, and externally threaded inlet and outlet ports extending from the housing, the connection assembly comprising:
  a fitment adapted to be received within at least one of the ports of the separator, the fitment including a bore for carrying fluid from/to the central heating circuit to/from the separator;
  a threaded connector disposed around the bore for securing the fitment to the or each port, the threaded connector having a hand grip area for facilitating tightening of the connector by hand; and
  a removable force transfer element receivable between the fitment and the threaded connector for transferring force between the threaded connector and the fitment.

The connection assembly securely connects a magnetic separator into a central heating system circuit. The threaded connector secures the fitment to each port, and is hand-tightened to avoid any possible damage to the filter housing caused by over tightening.

The connection assembly is particularly advantageous for use with larger filters, for example filters designed to be used in 28 mm central heating circuits. The connector to each port can be operated independently, so there is no problem with a relatively large separation between the inlet and outlet ports. Because the connection can be hand-tightened, the body of the separator can be made from plastics similar to smaller filters (for example, filters designed to be used in 22 mm heating systems).

The removable force transfer element assists in the disconnection of the port from the fitment without the need for tools and without causing damage to the connection assembly or separator.

The removable force transfer element may be a resilient clip, which may be part-circular. The clip may be attached onto the fitment, behind the threaded connector, and may transfer force from the threaded connector to the fitment as it is being unscrewed from the fitment, thereby driving the port (and separator) away from the fitment. The tight nature of the seal, particularly a piston type seal arrangement, described below, for sealing the fitment to the separator can make removal of the separator difficult, particularly if the seal is not greased. By providing a way of releasing the separator from the fitment in a controlled way, there is no need for a fitter to prise the separator away from the fitment and hence the risk of damage is significantly reduced. Also, the inlet and outlet ports can be released from pipe work incrementally, thus not putting any unnecessary stress on the separator or pipes.

The threaded connector may be formed as an internally threaded collar with a flange at one end thereof, the flange extending inwardly from the periphery of the collar. The threaded collar allows connection onto the externally threaded port of the separator, and the flange provides a bearing surface for holding the fitment into the port.

The fitment may include first and second spaced peripheral shoulders, in use, the threaded connector bearing against the first peripheral shoulder to hold the fitment to the port of the separator. The force transfer element, when fitted, sits between and bears against the second peripheral shoulder and the threaded connector. In other words, the flange of the threaded connector and the force transfer element sit between the two shoulders, and together they substantially fill the space between the two shoulders.

The fitment may be formed in two parts, that is, a first part may connect to at least one of the ports and the second part may connect to a valve assembly or further connection. Preferably the two parts are manufactured separately and then joined together in assembly. The two-part construction of the fitment allows for efficient manufacture and assembly of the connection assembly, in that the threaded connector may be held to the fitment by being assembled between the two parts of the fitment. Once the connection assembly is assembled, there is no need to detach the two parts of the fitment. However, a screw fixing is used in a preferred embodiment, which is found to facilitate easy and accurate assembly and a reliable connection. In other embodiments, the parts may be bonded together.

The first part of the fitment may include a spigot of a first diameter, which locates within one of the ports, a peripheral flange extending outwardly from the spigot, which in use butts up against the end of said port, and a further spigot extending away from the peripheral flange in the other direction (away from the port), the peripheral flange forming the first peripheral shoulder. The further spigot may have a smaller diameter than the first diameter, and may be threaded for attachment to a corresponding spigot on the second part of the fitment.

The fitment may include two spaced circumferential recesses for receiving O-ring seals. The recesses may be substantially part-circular. A double O-ring seal on a fitment located within the port of the separator provides for a particularly good seal, which requires only hand-tightening towards the filter to make it watertight at the pressure of a typical central heating circuit.

When the force transfer element is removed, a space is created between the flange of the threaded connector and the second shoulder, allowing the threaded connector to be moved up to the second shoulder, i.e. when not attached to a separator. This substantially exposes the first O-ring seal and makes servicing of the seal possible. The second O-ring seal can also be accessed for servicing. The second part of the fitment may include a spigot, which may be threaded for connection with the first part. Alternatively, the spigot of the second part may be effectively the same as the spigot of the first part, where the first and second parts are provided integrally. A flange may extend outwardly from the spigot of the second part to form the second peripheral shoulder. To assemble the connection assembly, the threaded connector may be placed over the threaded spigot of the first part of the fitment, and the second part of the fitment may then be screwed over the first part and through the middle of the flange of the threaded connector.

A further spigot, which may be threaded, may extend away from the other side of the flange of the second part for connection to the valve assembly or further connector.

The hand grip area of the threaded connector may be knurled. The diameter of the threaded connector may be, for example, around 52 mm. This facilitates easy hand operation of the threaded connector, because it sits well in hand and is easy to grip, and also discourages the use of spanners or other tightening tools which might damage the plastic housing of the separator.

The bore of the fitment may be tapered. This provides room in the fitment walls for a double O-ring seal, as described above, whilst avoiding any unnecessary discontinuities in the fluid path between the central heating circuit and the filter, which might lead to unwanted eddies in the flow and a greater pressure drop across the device.

The connection assembly may be provided in combination with a magnetic separator, for example a magnetic separator for a central heating system including a housing, a separation chamber within the housing, and externally threaded inlet and outlet ports extending from the housing. In particular, the distal end of each of the inlet and outlet ports may be internally chamfered for providing a lead-in for the O-ring seals. The chamfered end of each port may also provide a sealing surface for one of the O-ring seals, giving a particularly effective water-tight seal requiring only light hand-tightening of the threaded connector.

According to a second aspect of the invention, there is provided a sleeve for a magnet assembly of a magnetic separator for use in a central heating system, the sleeve comprising first and second sleeve members, and a connection for connecting respective ends of the first and second sleeve members together.

Magnetic separators typically include a magnetic assembly made up of a plurality of magnets, although the sleeve of the invention may equally be used with a magnetic assembly made from a single magnet.

The sleeve is made in two parts, connected together. This allows for a sleeve long enough to accommodate the magnetic assemblies needed in larger capacity filters, whilst maintaining a single central magnet assembly around which fluid may circulate within the separator housing. The two-part sleeve can also be made to be thin as compared with prior art sleeves of similar length. A thin sleeve with a tight-fitting magnetic assembly results in more effective separation of magnetic particles, because the magnetic field inside the separator, where the fluid flows, is effectively stronger at the surface of the sleeve.

The assembled two-part sleeve may be substantially sealed against ingress of magnetic particles. In other words, the sleeve may be free of significant gaps throughout, including in the area where the sleeves are connected together. Alternatively, there may be minor voids in the sleeve at the connection. The first and second sleeve members may be identical in shape, and this provides for a significant advantage in terms of tooling and manufacturing, since only a single part needs to be produced.

The connection means between the first and second members may include at least one resilient latch member on the first sleeve member and a co-operating recess on the second sleeve member and at least one resilient latch member on the second sleeve member and a co-operating recess on the first sleeve member. Most preferably, the connection may include two opposing resilient latch members and two opposing recesses on the first sleeve member, and two opposing resilient latch members and two opposing recesses on the second sleeve member, the latch members of the first sleeve member co-operating with the recesses of the second sleeve member and vice versa.

The connection system described above allows the first and second members to be easily assembled into a sleeve. The connection means can be engaged very quickly. Disconnection of the connection means to detach the first and second parts from each other may be fairly difficult, especially where two opposing resilient latches are provided on each sleeve member. However, once assembled, there is generally no reason to take the sleeve apart.

The connection system with opposing latches as described ensures that the sleeve members (which are preferably identical to each other) are attached to each other at a particular angle. Where separation chambers or trays are provided integrally with the sleeve, as described below, this property can have a significant advantage, in that the relative orientation of the chambers or trays is maintained. In the preferred embodiment disclosed herein, the tray has 4-fold rotational symmetry, so the trays of the respective first and second sleeve members will be essentially identical to each other when they are at 90 degrees to each other, which is the angle enforced by the connection means. Other embodiments of trays, for example as described in the applicant's patent application PCT/GB2013/051329, may have 2-fold rotational symmetry. However, such tray designs may work more effectively to separate particles where two are provided at a 90 degree angle to each other, to most evenly distribute the inlets and outlets to the separation trays around the housing of the separator. The advantage of identical sleeves connected at a 90 degree angle is therefore realised also with this type of tray.

The sleeve may include a roof and a tubular wall depending therefrom extending from the other end of each of the sleeve members, that is, from the end which does not have the connection means to connect to the other (possibly identical) sleeve member.

The roof may be substantially conical, and a circular tray may be adapted to connect with one of the roofs to form a chamber. The tray may include a plurality of upstands for slowing flow within the chamber. It will be understood that trays may be provided at both ends of the sleeve, or a tray may be provided only at one end. Preferably a tray is provided at the lower end, thereby facilitating collection of non-magnetic particles in the tray as well as in the "roof" of the upper sleeve, which is open and upwardly facing. In some embodiments, different trays may be provided at each end, even where the sleeve members (including their roofs) are identical.

Apertures may be provided in the roof, and top ends of the upstands may protrude through those apertures when the tray is attached.

BRIEF DESCRIPTION OF THE DRAWINGS

For a better understanding of the present invention, and to show more clearly how it may be carried into effect, reference will now be made, by way of example only, to the accompanying drawings, in which.

DESCRIPTION OF THE PREFERRED EMBODIMENT(S)

Figure 1:
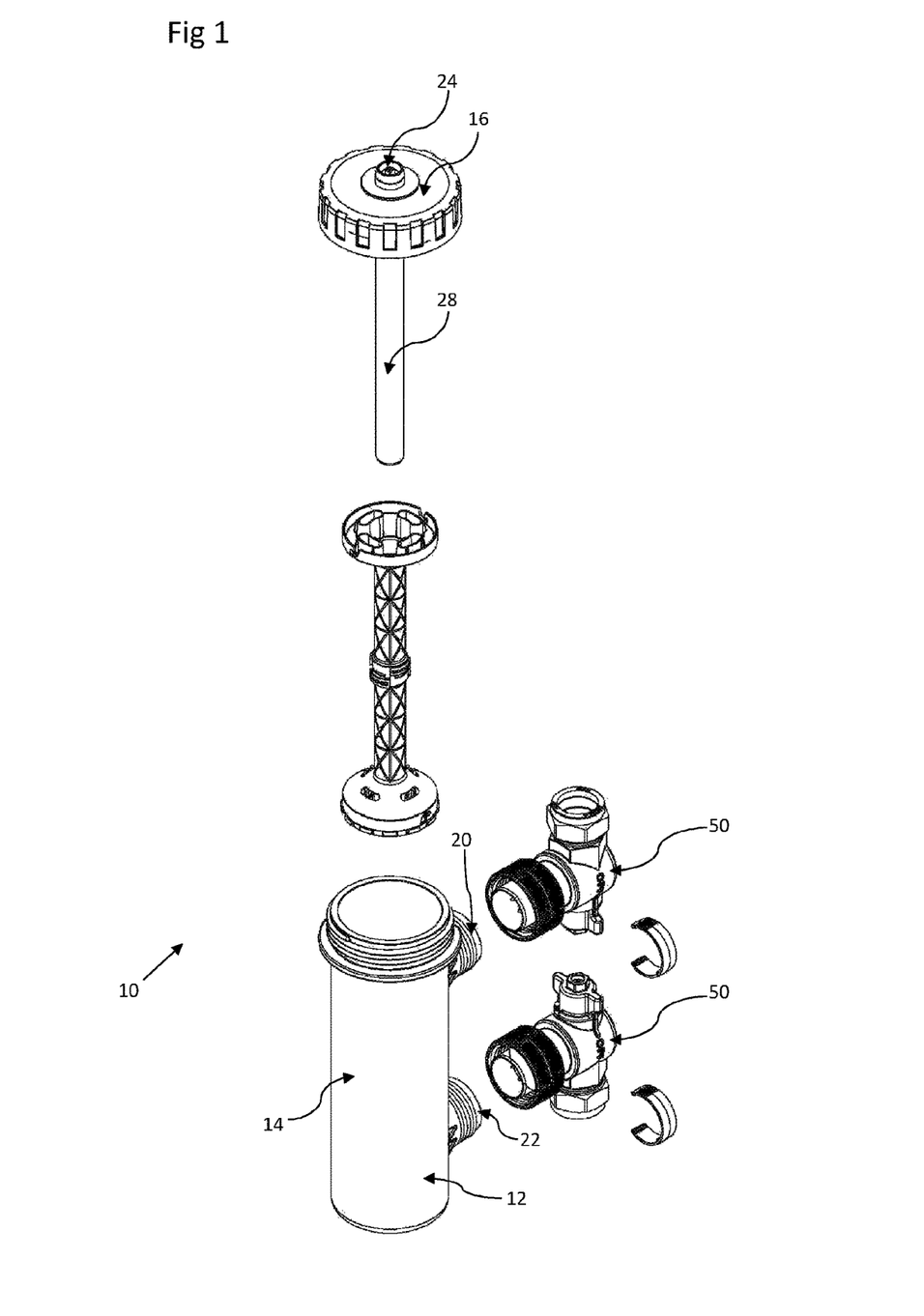
FIG. 1 shows an exploded perspective view of a separator of the invention, including housing, insert and connection assemblies.
Figure 2:
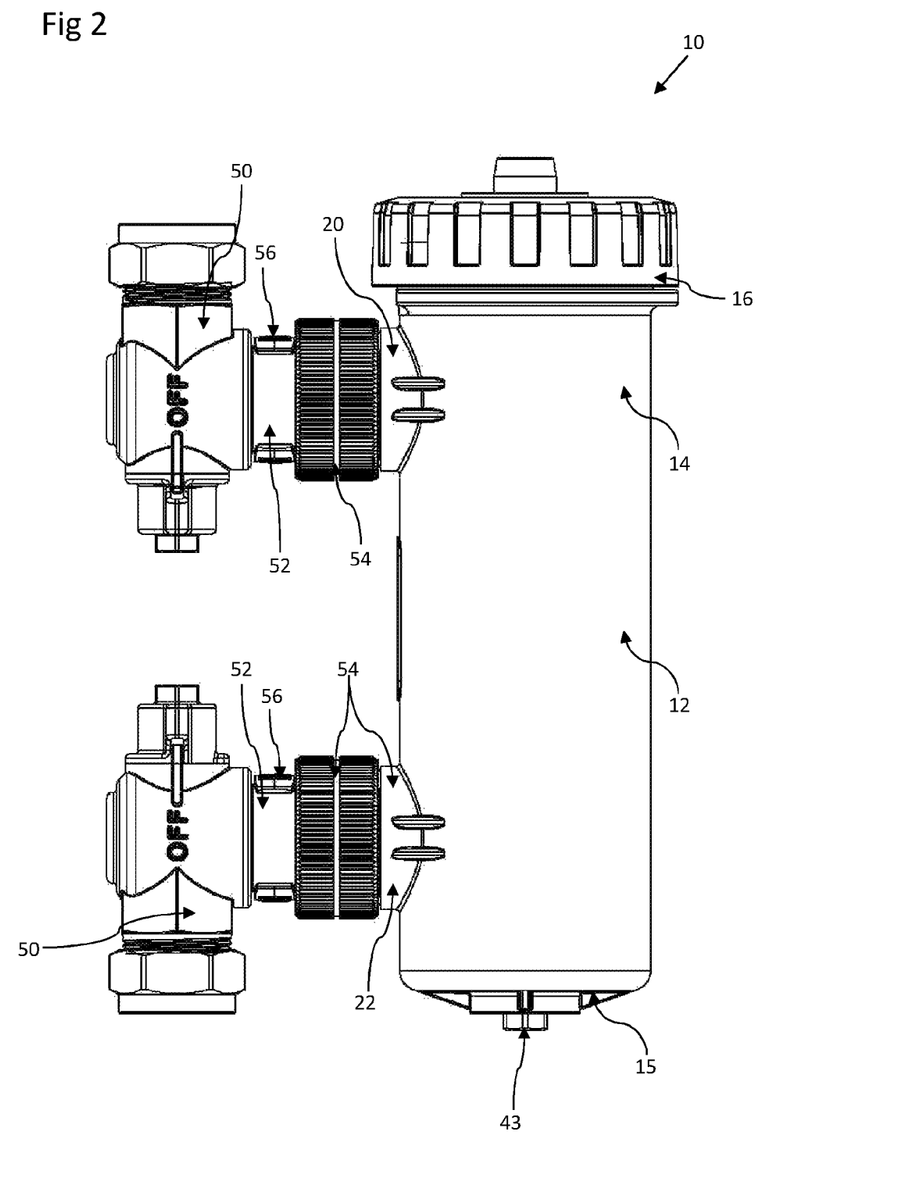
FIG. 2 shows a side view of the separator and connection assemblies of FIG. 1 when assembled.
Figure 3:
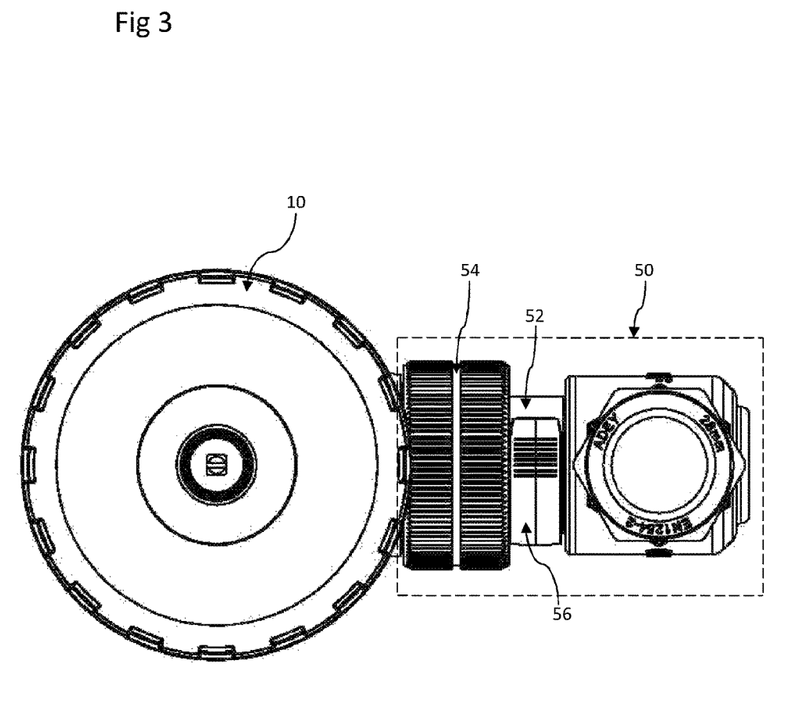
FIG. 3 shows a plan view from above of the separator and connection assemblies of FIGS. 1 and 2.

Referring firstly to FIGS. 1 to 3, a separator device for separating particles from suspension in a fluid is indicated generally at 10. The separator has a housing 12 including a substantially cylindrical body portion 14 with integral base 15, and a removable upper closure portion 16. The closure portion 16 is in the form of a screw-on cap, which screws onto the upper end of the housing 12, as viewed. An O-ring 18, seen in FIG. 5, locates in a circumferential groove formed in the cap and forms a watertight seal against the upper end of the body portion 14, when the cap is screwed down.

Inlet and outlet ports 20, 22 are provided as first and second hollow cylindrical sockets in the wall of the housing body 14. The central axes of the ports 20, 22 are parallel and lie one above the other on a diameter of the housing. In other words, the ports are adjacent to one another and face in the same direction extending perpendicular to a tangent of the substantially cylindrical body portion 14. The parallel nature of the ports 20, 22 facilitates fitting to a heating circuit, since the inlet and outlet will be in the same straight pipe line, when the device is installed. It will be appreciated that the ports may be interchangeable, that is, the outlet port can be used as an inlet port and vice versa in some embodiments. The ports 20, 22 are externally screw-threaded.

A bleed valve assembly 24 is provided through the centre of the screw-on cap 16. The assembly 24 is of the type that enables air to be bled out from the top of the separator, but also enables a rust inhibitor chemical to be injected into the separator. The assembly 24 also supports a magnet assembly 28, formed of one or more magnets, which depends centrally from the underside of the closure portion 16. The magnet assembly 28 is cylindrical and extends to proximate the base of the housing body 14.

A drain valve 43 comprising of a screw-in plug with seal is provided in the floor 15 of the housing body 14.

Figure 4:
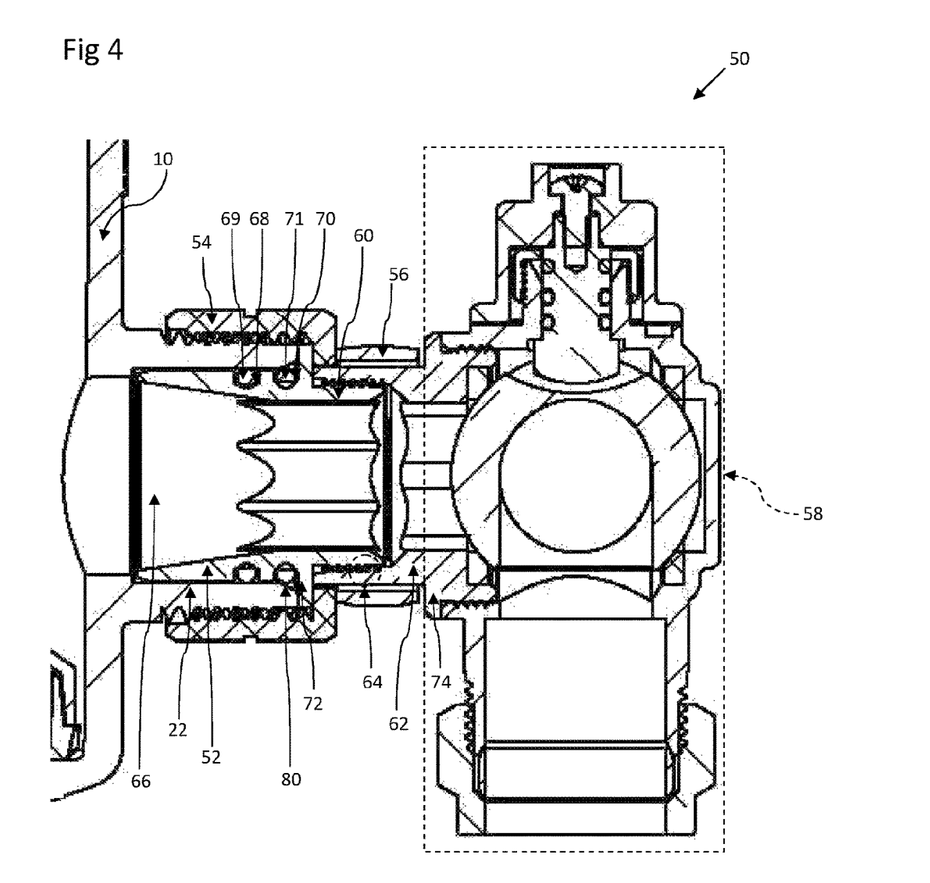
FIG. 4 shows a cross-sectional view through a port of the separator connected to a connection assembly of FIG. 1.

A connection assembly 50 is shown generally in FIGS. 1, 2 and 3, and in more detail in FIG. 4. A connection assembly 50 is provided on each of the inlet and outlet ports 20, 22, for connecting the separator 10 to a central heating circuit.

Each connection assembly 50 includes a fitment 52, a threaded connector 54, a force transfer element 56 and a valve portion 58. The valve portion 58 is of a well known design and will not be described in further detail. It will be appreciated that substantially any type of valve or other connector may be provided as part of a connection assembly according to the invention.

The fitment 52 is formed from a first part 60 and a second part 62. The parts are attached to each other by mutually interlocking screw threads 64. A fluid-carrying bore 66 is provided all the way through both parts 60, 62 of the fitment 52, for carrying fluid between the valve portion 58 and the separator 10.

The bore 66 in the first part 60 of the fitment 52 has a tapered section. Therefore, the wall of the first part 60 of the fitment 52 is thin at the distal end of the first part 60, and thickens towards the other end of the first part 60 (to the right-hand side in the drawing). The thicker part of the wall accommodates a pair of recesses 68, 70 which receive respective O-ring seals 69, 71. The thin part of the wall ensures that there is a smooth transition as fluid passes between the fitment 52 and the interior of the separator 10.

Adjacent the O-ring recess 70 which is most inward of the distal end of the first part 60, a shoulder or flange 72 extends around the first part. In use, this shoulder 72 butts against an end of the port 22 of the separator 10.

A second shoulder 74 is provided as part of the second part 62 of the fitment 52. The first and second shoulders 72, 74 define an area around the fitment 52 in which the threaded connector 54 can slide (in the drawing, the threaded connector can slide left-to-right). This allows the threaded connector 54 to be unscrewed from the port 22.

The force transfer element 56 is shown fitted between the shoulders 72, 74. When the force transfer element 56 is fitted in this position, the threaded connector 54 is prevented from sliding towards the shoulder 74, but may still be unscrewed from the port 22 of the separator. This forces the port 22 off the fitment 52. In other words, the action of unscrewing the threaded connector 54 brings it into contact with the force transfer element 56, thus exerting a force on the second part 62, which acts to forcibly separate the fitment 52 and the port 22 by virtue of the interlocked screw threads 64. The force transfer element 56 can be removed to allow sliding of the connector 54 towards the shoulder 74 for access to the O-ring seals, when unscrewed.

Figure 6:
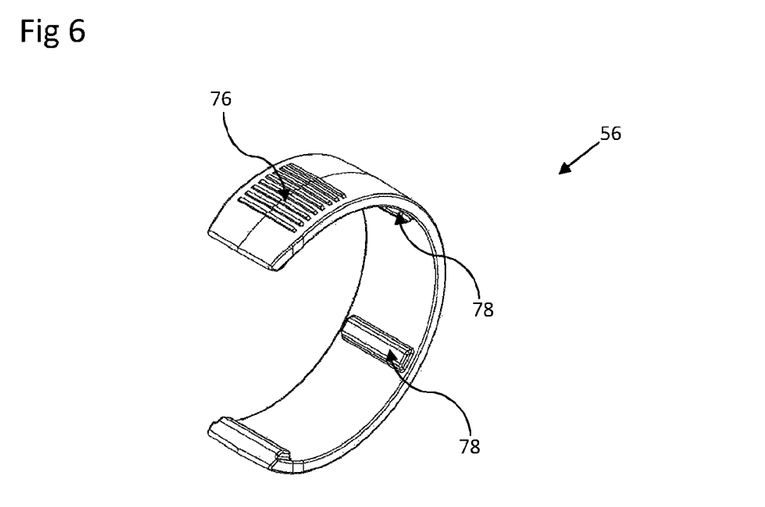
FIG. 6 shows a perspective view of a force transfer element of the separator and connection assembly of FIG. 1.

The force transfer element 56 is shown in more detail in FIG. 6, and is substantially C-shaped. It is made from a resilient plastics material, so that it can be deformed to clip over the substantially cylindrical sliding area between the shoulders 72, 74 of the fitment 52. The force transfer element 56 includes grip areas on its outer surface (only one grip area 76 is shown in the drawing, but another is provided on the other side, hidden in the drawing). On the inner surface of the force transfer element 56, ribs 78 are provided. When the force transfer element 56 is installed on the fitment 52, the ribs 78 lift the inner surface of the force transfer element 56 away from the fitment, making a space between the force transfer element 56 and the fitment which allows the force transfer element 56 to be easily removed by hand. The ribs 78 also allow for a force transfer element which is thin enough to be resilient and easily deformable for clipping over the fitment 52, but which also has an "effective thickness" great enough in use to transfer the disconnection forces between the threaded connector 54 and the shoulder 74.

When the connector assembly 50 is fitted to the port 22 of the separator 10, the first part of the fitment 52 is located within the port 22 and pushed in. The threaded connector 54 is then screwed tight by hand. The threaded connector 54 is knurled and has an external diameter of 52 mm in the embodiment shown, which is easy to grip. By virtue of the fitment 52 locating well into the port, there is a very low likelihood of cross-threading of the thread, which very important, because the thread on the port is made from plastics and a crossed thread would cause damage that would effectively require a new separator be fitted. The threaded connector 54 finally pushes the fitment 52 into and against the port 22. The O-ring 69 nearest to the distal end of the fitment seals against an interior surface of the port 22 and acts in the manner of a piston seal. The other O-ring 71, further to the right in the drawing, sits against a chamfered end 80 of the port 22 and seals in the manner of a trap seal. The seals are ideally lubricated with silicone grease. This sealing arrangement creates a highly effective watertight seal, which is easy to correctly apply even in a confined place, and requires only hand-tightening of the threaded connector 54. The force transfer element 56 can be clipped in behind the threaded connector 54, when tightened, to provide a visual indication that it has been tightened.

Figure 5:
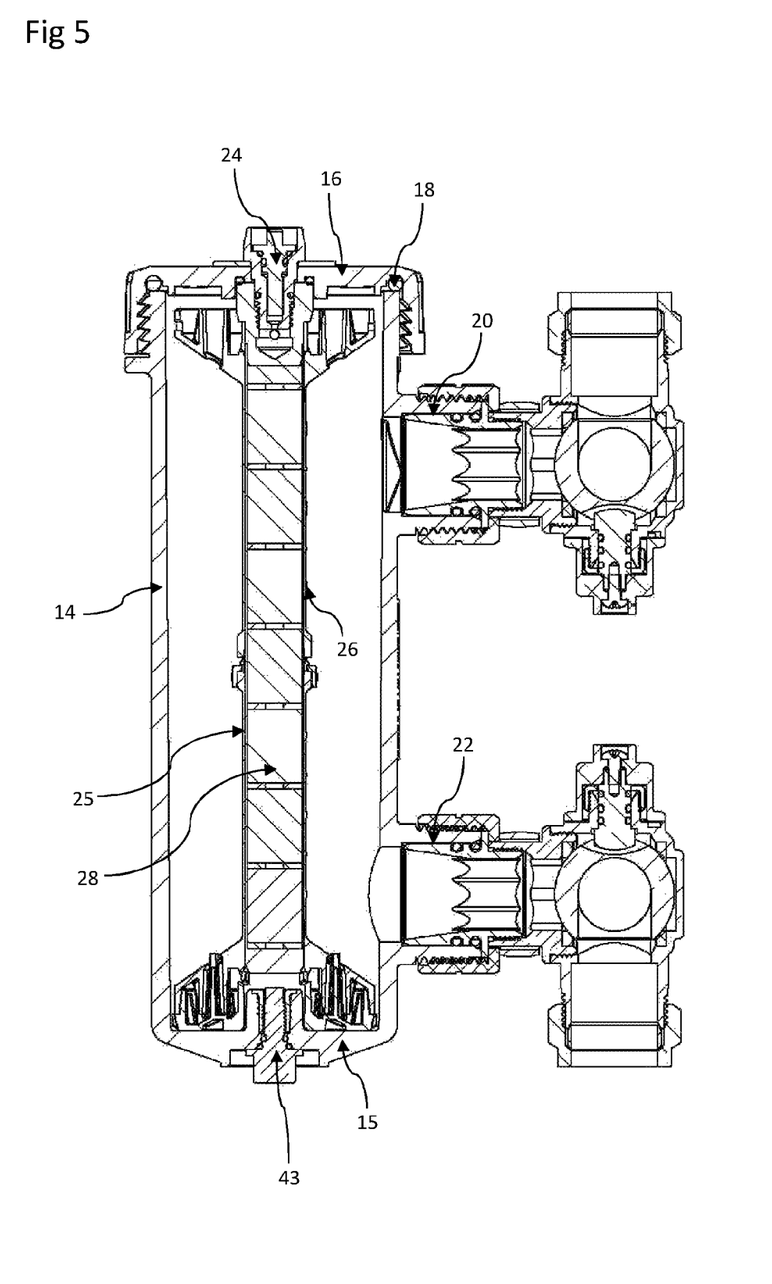
FIG. 5 shows a cross-sectional view through the assembled separator and connection assembly of FIG. 1.
Figure 7:
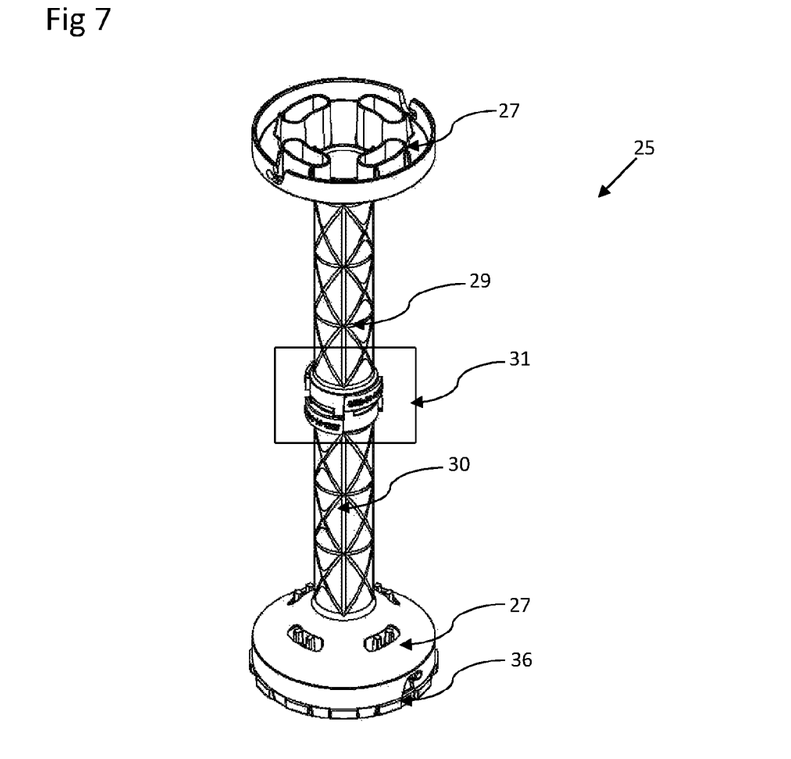
FIG. 7 shows a perspective view of the assembled insert of the separator of FIG. 1.
Figure 8:
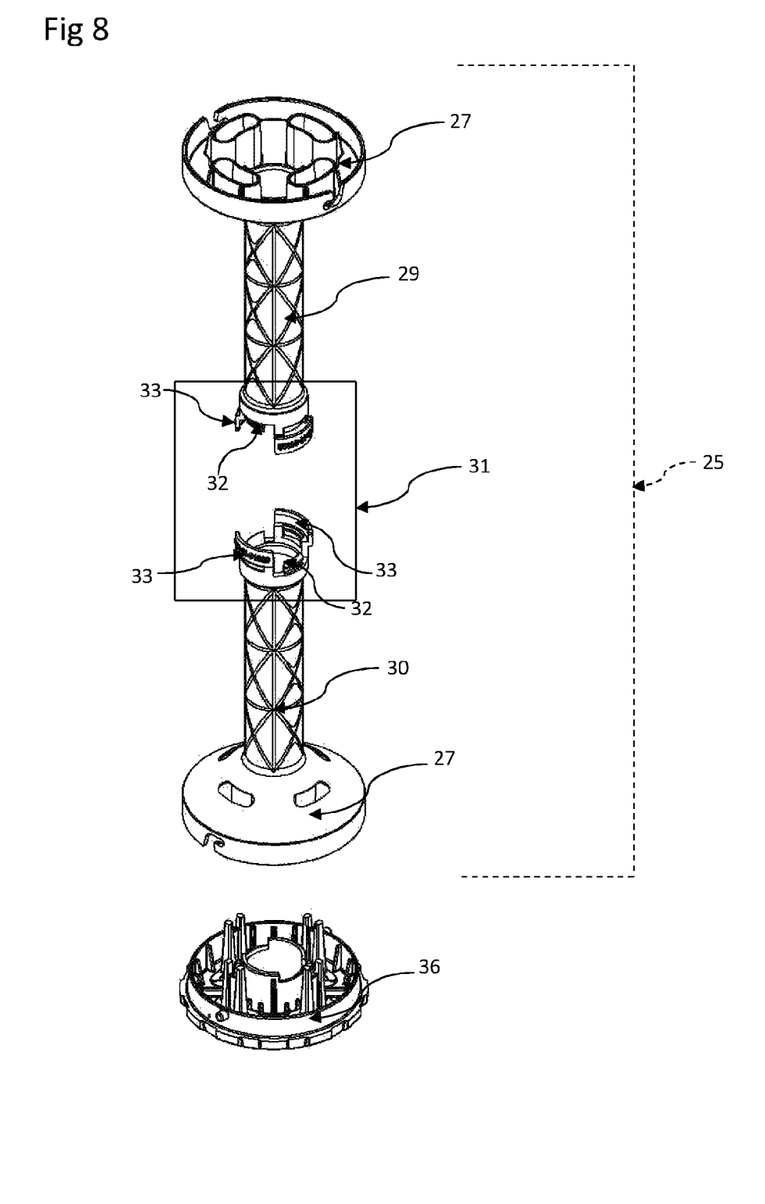
FIG. 8 shows an exploded perspective view of the assembled insert of FIG. 7.

Referring now to FIGS. 5, 7, and 8, an insert assembly 25 is disposed within the housing. The insert assembly 25 includes a thin plastics sleeve 26, containing one or more magnets 28, for removing magnetic debris from flow through the separator. The insert assembly also includes a roof 27 at either end, which forms part of a chamber for separating non-magnetic particles from flow within the separator 10. At one end (the lower end, as viewed), a tray 36 is provided with which the roof 27 forms a closed chamber. At the other end there is no tray, and so the chamber is more open.

The insert assembly 25 is formed as a first part 29 and a second part 30. The first and second parts 29, 30 are in fact identical. They are joined together to form the complete insert assembly 25, as shown in FIG. 7.

The two parts 29, 30 of the insert assembly 25 are joined by a snap-fit connection 31, which is best seen in FIG. 8. Each part 29, 30 includes two opposing resilient latch members 32 and two opposing walls with recesses 33. The latch members of one sleeve cooperate with the recesses of the other sleeve, and vice versa, to securely and semi-permanently attach the parts of the insert assembly 25 together.

The snap fit connector is ideal, because the connection is semi-permanent, secure, free from substantial gaps, and enforces correct orientation of the roofs 27 with respect to each other. It solves the manufacturing problems involved with making a sleeve of such length in one piece, and allows the wall of the sleeve to be very thin, for the best magnetic separation.

The embodiments described above are provided by way of example only, and various changes and modifications will be apparent to persons skilled in the art without departing from the scope of the present invention as defined by the appended claims.

The invention claimed is:

1. A connection assembly for connecting a magnetic separator into a central heating system circuit, the magnetic separator including a housing, a separation chamber within the housing, and externally threaded inlet and outlet ports extending from the housing, the connection assembly comprising:

a fitment adapted to be received within at least one of the ports of the separator, the fitment including a bore for carrying fluid from/to the central heating circuit to/from the separator;

a threaded connector disposed around the bore for securing the fitment to the or each port, the threaded connector having a hand grip area for facilitating tightening of the connector by hand; and a removable force transfer element in the form of a resilient clip receivable between the fitment and the threaded connector for transferring force between the threaded connector and the fitment, and, when installed on the fitment, the removable force transfer element being removable therefrom whilst the fitment and threaded connector remain fitted to the or each port.

2. The connection assembly of claim 1, wherein the resilient clip is part-circular.

3. The connection assembly of claim 1, wherein the force transfer element engages with one end of the threaded connector and holds the threaded connector at a fixed distance from the fitment for causing the port to move away from the fitment as the threaded connector is unscrewed from the port.

4. The connection assembly of claim 1, wherein the threaded connector is formed as an internally threaded collar with a flange at one end thereof, the flange extending inwards from the periphery of the collar.

5. The connection assembly claim 1, wherein the fitment includes first and second spaced peripheral shoulders, in use, the threaded connector bearing against the first peripheral shoulder to hold the fitment to the port of the separator, and the force transfer element bearing against the second peripheral shoulder.

6. The connection assembly of claim 5, wherein the fitment comprises a first part which connects to at least one of the ports and a second part for connection to a valve assembly or further connector.

7. The connection assembly of claim 6, wherein the second part includes a spigot for connection with the first part and a flange extending outwardly from the spigot forming the second peripheral shoulder.

8. The connection assembly of claim 7, wherein a further spigot extends away from the other side of the flange of the second part for connection to the valve assembly or further connector.

9. The connection assembly of claim 6, wherein the first part includes a spigot of a first diameter, which locates within said at least one of the ports, a peripheral flange extending outwardly from the spigot, which in use butts up against the end of said at least one of the ports, the peripheral flange forming the first peripheral shoulder.

10. The connection assembly of claim 9, wherein a further spigot extends away from the peripheral flange in the other direction, the further spigot having a smaller diameter than the first diameter.

11. The connection assembly of claim 1, wherein the bore of the fitment is tapered.

12. A separator and connection assembly, comprising: a magnetic separator for a central heating system, the magnetic separator including a housing, a separation chamber within the housing, and externally threaded inlet and outlet ports extending from the housing, and a connection assembly, the connection assembly comprising:

a fitment adapted to be received within at least one of the ports of the separator, the fitment including a bore for carrying fluid from/to the central heating circuit to/from the separator;

a threaded connector disposed around the bore for securing the fitment to the or each port, the threaded connector having a hand grip area for facilitating tightening of the connector by hand; and a removable force transfer element receivable between the fitment and the threaded connector for transferring force between the threaded connector and the fitment, and, when installed on the fitment, the removable force transfer element being removable therefrom whilst the fitment and threaded connector remain fitted to the or each port.

13. The separator and connection assembly of claim 12, wherein the part of the fitment which is received within the port or ports has two spaced circumferential recesses for receiving O-ring seals, and the distal end of each port is internally chamfered for providing a lead-in for the O-ring seals.

14. The separator and connection assembly of claim 13, wherein the chamfered end of each port provides a sealing surface for one of the O-ring seals.

15. The separator and connection assembly of claim 12, wherein the removable force transfer element is a resilient clip.

16. The separator and connection assembly of claim 12, wherein the force transfer element engages with one end of the threaded connector and holds the threaded connector at a fixed distance from the fitment for causing the port to move away from the fitment as the threaded connector is unscrewed from the port.

17. The separator and connection assembly of claim 12, wherein the threaded connector is formed as an internally threaded collar with a flange at one end thereof, the flange extending inwards from the periphery of the collar.

18. The separator and connection assembly of claim 12, wherein the fitment includes first and second spaced peripheral shoulders, in use, the threaded connector bearing against the first peripheral shoulder to hold the fitment to the port of the separator, and the force transfer element bearing against the second peripheral shoulder.

19. A connection assembly for connecting a magnetic separator into a central heating system circuit, the magnetic separator including a housing, a separation chamber within the housing, and externally threaded inlet and outlet ports extending from the housing, the connection assembly comprising:

a fitment adapted to be received within at least one of the ports of the separator, the fitment including a bore for carrying fluid from/to the central heating circuit to/from the separator;

a threaded connector disposed around the bore for securing the fitment to the or each port, the threaded connector having a hand grip area for facilitating tightening of the connector by hand; and a removable force transfer element receivable between the fitment and the threaded connector for transferring force between the threaded connector and the fitment, and, when installed on the fitment, the removable force transfer element being removable therefrom whilst the fitment and threaded connector remain fitted to the or each port, wherein the part of the fitment which is received within the port or ports has two spaced circumferential recesses for receiving O-ring seals.

20. A connection assembly for connecting a magnetic separator into a central heating system circuit, the magnetic separator including a housing, a separation chamber within the housing, and externally threaded inlet and outlet ports extending from the housing, the connection assembly comprising:

a fitment adapted to be received within at least one of the ports of the separator, the fitment including a bore for carrying fluid from/to the central heating circuit to/from the separator;

a threaded connector disposed around the bore for securing the fitment to the or each port, the threaded connector having a knurled hand grip area for facilitating tightening of the connector by hand; and a removable force transfer element receivable between the fitment and the threaded connector for transferring force between the threaded connector and the fitment, and, when installed on the fitment, the removable force transfer element being removable therefrom whilst the fitment and threaded connector remain fitted to the or each port.

* * * * *